(12) United States Patent
Karapantelakis et al.

(10) Patent No.: US 11,812,310 B2
(45) Date of Patent: Nov. 7, 2023

(54) MIGRATION OF COMPUTATIONAL SERVICE

(71) Applicant: Telefonaktiebolaget LM Ericsson (publ), Stockholm (SE)

(72) Inventors: Athanasios Karapantelakis, Solna (SE); Rafia Inam, Västerås (SE); Aneta Vulgarakis Feljan, Stockholm (SE); Adam Bergkvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 17/427,087

(22) PCT Filed: Feb. 6, 2019

(86) PCT No.: PCT/EP2019/052891
§ 371 (c)(1),
(2) Date: Jul. 29, 2021

(87) PCT Pub. No.: WO2020/160764
PCT Pub. Date: Aug. 13, 2020

(65) Prior Publication Data
US 2022/0104079 A1 Mar. 31, 2022

(51) Int. Cl.
*H04W 36/00* (2009.01)
(52) U.S. Cl.
CPC ... *H04W 36/0022* (2013.01); *H04W 36/0072* (2013.01)
(58) Field of Classification Search
None
See application file for complete search history.

(56) References Cited

U.S. PATENT DOCUMENTS

| 8,572,290 B1 * | 10/2013 | Mukhopadhyay | ...... H04L 47/70 709/251 |
| 10,223,131 B1 * | 3/2019 | Lieberman | .......... G06F 11/3664 |

(Continued)

FOREIGN PATENT DOCUMENTS

| CN | 107133087 A | 9/2017 |
| EP | 2755422 A1 | 7/2014 |

OTHER PUBLICATIONS

International Search Report and Written Opinion for Application No. PCT/EP2019/052891, dated Sep. 30, 2019, 15 pages.

(Continued)

*Primary Examiner* — Kenny S Lin
(74) *Attorney, Agent, or Firm* — Nicholson De Vos Webster & Elliott LLP

(57) ABSTRACT

Mechanisms for migration of a stateless computation service in a mobile communication network. A method, performed by a control node comprises obtaining, from a core network node in the mobile communication network, information indicative of a need to migrate the stateless computation service from a source compute node in the mobile communication network. The need results from resource utilization at the source compute node is too high, and/or a demand from user equipment for the stateless computation service elsewhere in the mobile communication network. The method comprises initiating migration of the stateless computation service from the source compute node to a target compute node in the mobile communication network for hosting of the stateless computation service at the target compute node.

8 Claims, 6 Drawing Sheets

(56) References Cited

U.S. PATENT DOCUMENTS

| | | | |
|---|---|---|---|
| 2005/0273668 A1* | 12/2005 | Manning | H04L 12/66 714/39 |
| 2011/0022711 A1 | 1/2011 | Cohn | |
| 2014/0215060 A1* | 7/2014 | Mo | G06F 9/00 709/224 |
| 2018/0024854 A1* | 1/2018 | Wang | G06F 12/1027 718/1 |
| 2019/0019109 A1* | 1/2019 | Sadaghiani | G06N 5/01 |
| 2019/0306766 A1* | 10/2019 | Ketyko | H04L 41/147 |
| 2020/0184380 A1* | 6/2020 | Thomas | G06N 3/063 |

OTHER PUBLICATIONS

ETSI GR MEC 018 V1.1.1, "Mobile Edge Computing (MEC); End to End Mobility Aspects," Oct. 2017, 52 pages, ETSI.
Oumer Teyeb et al., "Evolving LTE to Fit the 5G Future," Jan. 31, 2017, 17 pages, Ericsson Technology Review, Charting the Future of Innovation, #1, Ericsson AB.
Communication pursuant to Article 94(3) EPC, EP Application No. 19703988.6, dated Jan. 14, 2022, 9 pages.
Communication pursuant to Article 94(3) EPC, EP Application No. 19703988.6, dated Jul. 11, 2022, 8 pages.
Communication under Rule 71(3) EPC, EP Application No. 19703988.6, dated Apr. 4, 2023, 8 pages.
International Preliminary Report on Patentability, Application No. PCT/EP2019/052891, dated Aug. 10, 2021, 11 pages.

* cited by examiner

MIGRATION OF COMPUTATIONAL SERVICE

CROSS-REFERENCE TO RELATED APPLICATIONS

This application is a National stage of International Application No. PCT/EP2019/052891, filed Feb. 6, 2019, which is hereby incorporated by reference.

TECHNICAL FIELD

Embodiments presented herein relate to a method, a control node, a computer program, and a computer program product for migration of a stateless computational service in a mobile communication network. Embodiments presented herein further relate to a method, a core network node, a computer program, and a computer program product for facilitating such migration.

BACKGROUND

Capacity demands at the network edge, but also elsewhere in the mobile communication network, is increasing in tandem with the deployment of massive Internet of Things (IoT) based applications, having near real-time demands for execution. From the perspective of a fifth generation (5G) mobile communication network, these applications fall into two large use-case categories, defined as "Ultra Reliable Low Latency Communication" (URLLC) and massive machine type communications (mMTC). Such applications could involve user equipment (UE), such as mobile phones, robots, drones, augmented reality (AR) or virtual reality (VR) wearables such as glasses or helmets, Intelligent transportation systems (ITS), such as autonomous vehicles, roadside infrastructure etc. Given their lack of own computational capacity to execute complex decision-making, UEs may request to utilize an execution instance of a computation service provided in the mobile communication network.

The use of computation services in operation and maintenance of mobile communication networks is thus increasing due to their inherent advantage for decision support automation, based on a large amount of data in real-time. Execution of the computation services might be performed anywhere in the mobile communication network; from the network edge (e.g. in devices, gateways or radio access network nodes) to the packet-switching based service data network (e.g. in a computational cloud).

In many of these applications low-latency (such as less than 1 ms latency) control loops between the requestor (i.e., the UE), executor (i.e., the node in the network executing the computational service), computational result (i.e., the result found by executing the computational service) and transmission of a response with the result from the executor to the requestor is essential. From this perspective, it could therefore be advantageous to provide the executors close to the network edge.

However, providing the network edge with executors of computational services is expensive and it can therefore not be assumed that all radio base stations will be equipped with the necessary hardware (and software) needed for the radio base stations to act as executors of computational services.

Additionally, the radio base stations might be congested with other types of traffic and hence the terminal devices in need of execution of the computation services at the radio base station might have difficulty in having their requests granted in a timely manner.

Hence, there is still a need for improved handling of computational services in mobile communication networks.

SUMMARY

An object of embodiments herein is to enable efficient handling of computational services in mobile communication networks, enabling the above issues to be resolved, or at least mitigated or reduced.

According to a first aspect there is presented a method for migration of a stateless computation service in a mobile communication network. The method is performed by a control node. The method comprises obtaining, from a core network node in the mobile communication network, information indicative of a need to migrate the stateless computation service from a source compute node in the mobile communication network. The need results from resource utilization at the source compute node is too high, and/or a demand from UE for the stateless computation service elsewhere in the mobile communication network. The method comprises initiating migration of the stateless computation service from the source compute node to a target compute node in the mobile communication network for hosting of the stateless computation service at the target compute node.

According to a second aspect there is presented a control node for migration of a stateless computational service in a mobile communication network. The control node comprises processing circuitry. The processing circuitry is configured to cause the control node to obtain, from a core network node in the mobile communication network, information indicative of a need to migrate the stateless computation service from a source compute node in the mobile communication network. The need results from resource utilization at the source compute node is too high, and/or a demand from UE for the stateless computation service elsewhere in the mobile communication network. The processing circuitry is configured to cause the control node to initiate migration of the stateless computation service from the source compute node to a target compute node in the mobile communication network for hosting of the stateless computation service at the target compute node.

According to a third aspect there is presented a control node for migration of a stateless computational service in a mobile communication network. The control node comprises an obtain module configured to obtain, from a core network node in the mobile communication network, information indicative of a need to migrate the stateless computation service from a source compute node in the mobile communication network. The need results from resource utilization at the source compute node is too high, and/or a demand from UE for the stateless computation service elsewhere in the mobile communication network. The control node comprises an initiate module configured to initiate migration of the stateless computation service from the source compute node to a target compute node in the mobile communication network for hosting of the stateless computation service at the target compute node.

According to a fourth aspect there is presented a computer program for migration of a stateless computational service in a mobile communication network. The computer program comprises computer program code which, when run on processing circuitry of a control node, causes the control node to perform a method according to the first aspect.

According to a fifth aspect there is presented method for facilitating migration of a stateless computation service in a mobile communication network. The method is performed by a core network node. The method comprises obtaining, from a mobility function entity in the mobile communication network, information indicative of resource utilization at a source compute node in the mobile communication network hosting the stateless computation service, and/or demand from UE for the stateless computation service elsewhere in the mobile communication network. The method comprises providing, towards a control node in the mobile communication network, the information.

According to a sixth aspect there is presented a core network node for facilitating migration of a stateless computational service in a mobile communication network. The core network node comprises processing circuitry. The processing circuitry is configured to cause the core network node to obtain, from a mobility function entity in the mobile communication network, information indicative of resource utilization at a source compute node in the mobile communication network hosting the stateless computation service, and/or demand from UE for the stateless computation service elsewhere in the mobile communication network. The processing circuitry is configured to cause the core network node to provide, towards a control node in the mobile communication network, the information.

According to a seventh aspect there is presented a core network node for facilitating migration of a stateless computational service in a mobile communication network. The core network node comprises an obtain module configured to obtain, from a mobility function entity in the mobile communication network, information indicative of resource utilization at a source compute node in the mobile communication network hosting the stateless computation service, and/or demand from UE for the stateless computation service elsewhere in the mobile communication network. The core network node comprises a provide module configured to provide, towards a control node in the mobile communication network, the information.

According to an eight aspect there is presented a computer program for facilitating migration of a stateless computational service in a mobile communication network, the computer program comprising computer program code which, when run on processing circuitry of a core network node, causes the core network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these control nodes, these core network nodes, these computer programs, and this computer program enable efficient handling of computational services in the mobile communication network.

Advantageously these methods, these control nodes, these core network nodes, these computer programs, and this computer program improve the allocation of computational resources, for example according to spatiotemporal demands and computational resource availability.

Advantageously these methods, these control nodes, these core network nodes, these computer programs, and this computer program enable control loops to be shortened as a result of the improved execution of the computation service.

Advantageously these methods, these control nodes, these core network nodes, these computer programs, and this computer program can be implemented in existing third generation partnership project (3GPP) mobile communication networks.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
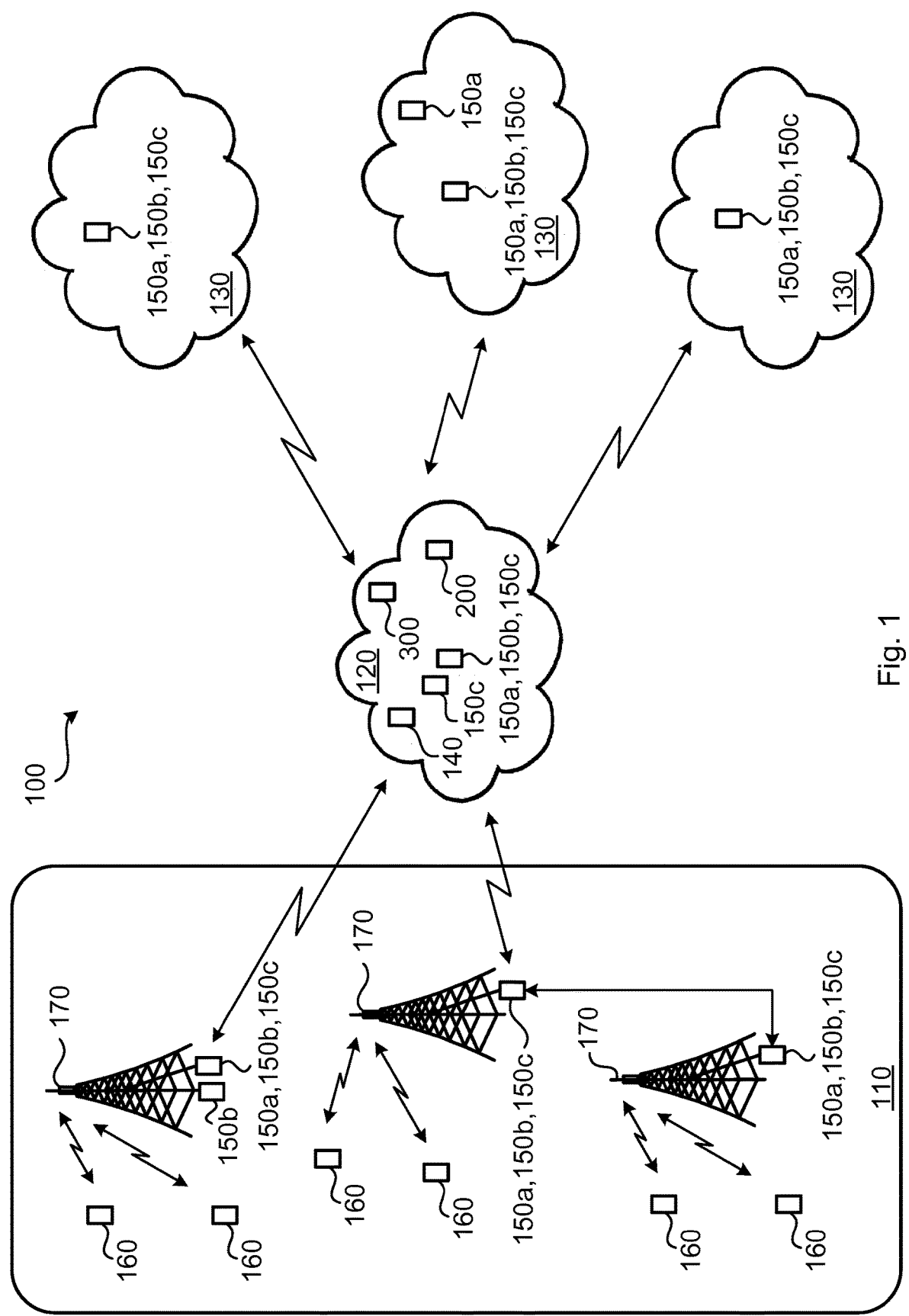
FIG. 1 is a schematic diagram illustrating a mobile communication network according to embodiments.

FIG. 1 is a schematic diagram illustrating a mobile communications network 100 where embodiments presented herein can be applied. The mobile communications network 100 comprises a radio access network 110, a core network 120, and a plurality of packet based service data networks 130.

One or more compute nodes 150a, 150b, 150c might be provided in any of the network parts; in the radio access network 110, in the core network 120, and/or in the packet based service data networks 130. The compute nodes 150a, 150b, 150c provide computation services for UE 160. Nonlimiting examples of compute nodes are: a set of one or more Central Processing Units (CPUs), a set of one or more Graphics Processing Units (GPUs), and a set of one or more Tensor Processing Units (TPUs). Hereinafter, compute node 150a will represent a source compute node, compute node 150b will represent a target compute node, and compute node 150c will represent a candidate (but not selected) target node.

The radio access network 110 comprises base stations 170 that provide network access to the UE 160. The pieces of UE 160 are thereby enabled to access services and exchange data with the compute nodes 150a, 150b, 150c.

The core network 120 comprises a mobility function entity 140. The mobility function entity 140 could be e.g. a Mobility Management Entity (MME), or an Access and Mobility Management Function (AMF) entity.

The mobile communication network 100 further comprises a control node 200 and a core network node 300. In some aspects, the control node 200 is provided in an Application Server (AS) node of the mobile communication network 100. In some aspects the core network node 300 is provided in a Capability Exposure Function (CEF) entity or a Service Capability Exposure Function (SCEF) entity in the core network 120 of the mobile communication network 100. Further aspects of the control node 200 and the core network node 300 will be disclosed below.

It is assumed that at least some of the UE 160 at one point or another, and at one location or another, needs to access one of the compute nodes 150a, 150b, 150c for execution of a computation service. One example of such computation services is a machine learning (ML) model, where the UE 160 thus request execution of the ML model for a particular set of data. The computation service might relate to any of object detection, speech recognition, object control (e.g. control of a robot for pathfinding/planning), etc.

The UE 160 thus act as requesting nodes that make requests for execution of a computation service at a compute node 150a, 150b, 150c. The compute nodes 150a, 150b, 150c are configured to execute one or more computation services. The compute nodes 150a, 150b, 150c might thus store necessary data, models, and code needed for execution of the one or more computation services.

As disclosed above there is a need for improved handling of computational services in mobile communication networks 100.

It is assumed that only a limited number of compute nodes 150a, 150b, 150c are provided in the mobile communication network 100 and, for example, that not each base stations 170 is equipped with its own compute node. Current approaches for enabling UE 160 access to compute nodes 150a, 150b, 150c for execution of computation service is fairly static, as computational resources are allocated a priori to pre-determined compute nodes 150a, 150b, 150c in the mobile communication network 100.

This runs counter to the dynamic nature of traffic behavior in mobile communication network 100 in particular, which implies that at different times, different parts of the mobile communication network 100 may become congested, based on end-user demand, mobility patterns, etc.

According to the herein disclosed embodiments, migration of the computation service is enabled from one compute node to another compute node in the mobile communication network 100. As will be disclosed in more detail below, this migration might be triggered by different factors, such as upon detection of network congestion or peak demand for a particular computation service, and/or for a computation service at a particular compute node 150a, 150b, 150c or base station 170, or or group of compute nodes 150a, 150b, 150c or base station 170, etc.

The embodiments disclosed herein thus relate to mechanisms for migration of a stateless computational service in a mobile communication network 100 and facilitating migration of a stateless computational service in a mobile communication network 100. In order to obtain such mechanisms there is provided a control node 200, a method performed by the control node 200, a computer program product comprising code, for example in the form of a computer program, that when run on processing circuitry of the control node 200, causes the control node 200 to perform the method. In order to obtain such mechanisms there is further provided a core network node 300, a method performed by the core network node 300, and a computer program product comprising code, for example in the form of a computer program, that when run on processing circuitry of the core network node 300, causes the core network node 300 to perform the method.

Figure 2:
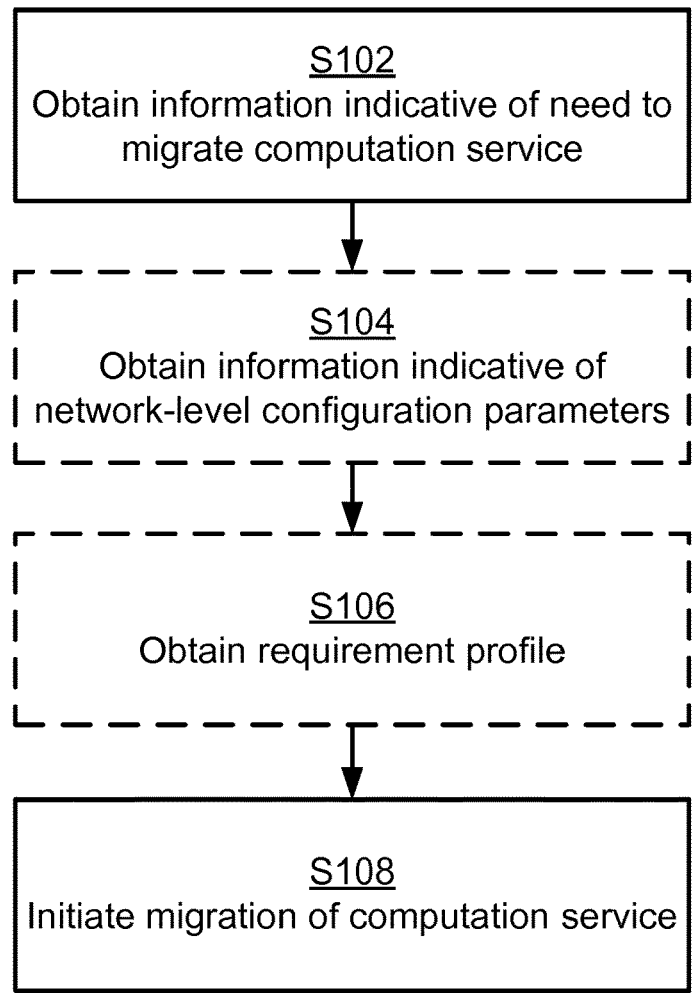
FIGS. 2 and 3 are flowcharts of methods according to embodiments.

Reference is now made to FIG. 2 illustrating a method for migration of a stateless computational service in a mobile communication network 100 as performed by the control node 200 according to an embodiment.

It is assumed that there is a need to migrate the stateless computation service from a compute node 150a (hereinafter referred to as source compute node 150a) in the mobile communication network 100. In particular the control node 200 is configured to perform step S102:

S102: The control node 200 obtains, from the core network node 300 in the mobile communication network 100, information indicative of a need to migrate the stateless computation service from a source compute node 150a in the mobile communication network 100. The need results from resource utilization at the source compute node 150a being too high, and/or a demand from UE 160 for the stateless computation service elsewhere in the mobile communication network 100.

A decision is then made as to where the computation service is to migrated. It is here assumed that the computation service is to be migrated to another compute node 150b (hereinafter referred to as target compute node 150b) in the mobile communication network 100. In particular the control node 200 is configured to perform step S108:

S108: The control node 200 initiates migration of the stateless computation service from the source compute node 150a to a target compute node 150b in the mobile communication network 100 for hosting of the stateless computation service at the target compute node 150b.

The control node 200 could thus be regarded as acting as, or implementing the functionality of, an Adaptive Model Orchestrator (AMO) that thus is configured to determine whether or not to migrate the computation service and if so, to what target compute node 150b the computation service is to be migrated to.

The computational service is stateless, meaning that it itself does not require any storage of data, which enables the migration to be performed without need for data synchronization between the source compute node 150a and the target compute node 150b.

Embodiments relating to further details of migration of a stateless computational service in a mobile communication network 100 as performed by the control node 200 will now be disclosed.

As disclosed with reference to FIG. 1, there could be different possible locations of the compute nodes 150a, 150b, 150c in the mobile communication network 100. The same thus applies for the source compute node 150a and the target compute node 150b. Hence, according to an embodiment the source compute node 150a and the target compute node 150b each might be provided in a node of a radio access network 110, in a node of a core network 120, or in a node of a packet data network 130 of the mobile communication network 100. In this respect, the source compute node 150a and the target compute node 150b might be provided in the same network part (such as in the radio access network 110, the core network 120, a packet data network 130) or in different such network parts. Hence, the computation service might be migrated within or between radio access network 110, the core network 120, and the packet data network 130. That is, according to an embodiment, migration of the stateless computation service is within, or between, the radio access network 110, the core network 120, and the packet data network 130. The migration of the stateless computation service might thus be vertical and/or horizontal within the mobile communication network 100. Hence, for example depending on network performance and traffic demands in mobile communication network 100, the control node 200 might initiate the stateless computation service to be migrated towards the edge of the mobile communication network 100, or towards the core network 120, or towards an external public cloud provider operating in the packet data network 130.

There might be different ways to determine whether the target compute node 150b is to be located within the same network part as the source compute node 150a or not. Particularly, according to an embodiment, whether to initiate migration of the stateless computation service within, or between, the radio access network 110, the core network 120, and the packet data network 130 depends on which type the need is. For example, migration of the stateless computation service might be initiated so that the stateless computation service is migrated within, or towards, the radio access network 110 when there is a high demand from UE 160 for the stateless computation service elsewhere in the mobile communication network 100 than at the source compute node 150a. For example, migration of the stateless computation service might be initiated so that the stateless computation service is migrated within, or towards, the packet data network 130 when resource utilization at the source compute node 150a is too high and/or there is not a high demand from UE 160 for the stateless computation service. Further examples relating to this are provided below.

There could be different ways in which the stateless computation service is migrated. The migration might pertain to either a replication or a transfer of the stateless computation service. In terms of transfer of the stateless computation service, execution of the stateless computation service is terminated at the source compute node 150a once the the stateless computation service has been migrated to the target compute node 150b. That is, for transfer of the stateless computation service to the target compute node 150b, the stateless computation service is removed from the source compute node 150a upon the migration. In terms of replication of the stateless computation service, execution of the stateless computation service is not terminated at the source compute node 150a, and hence the stateless computation service will continue to run on the source compute node 150a in parallel with the target compute node 150b. That is, for replication of the stateless computation service at the target compute node 150b, the stateless computation service also is maintained at the source compute node 150a upon the migration. According to an embodiment, whether to replicate or to transfer the stateless computation service depends on which type the need is. For example, migration of the stateless computation service might be a replication when there is a high demand from UE 160 for the stateless computation service elsewhere in the mobile communication network 100 than at the source compute node 150a. For example, migration of the stateless computation service might be a replication in scenarios of network expansion, e.g. when new base stations 170 are introduced. In such scenarios, capacity planning may necessitate introduction of additional compute nodes 150a, 150b, 150c close to the new base stations 170. For example, migration of the stateless computation service might be a replication in scenarios of increased demand of current UEs 160 not necessarily elsewhere in the network 100. In this type of scenarios, replication can occur locally, for example to a compute node 150a, 150b, 150c nearby (nearby here, for example, meaning a few network hops). For example, migration of the stateless computation service might be a transfer when resource utilization at the source compute node 150a is too high. For example, migration of the stateless computation service might be a transfer when the source compute node 150a is malfunctioning, e.g. there is an imminent hardware failure. For example, migration of the stateless computation service might be a transfer in scenarios of network connection failure toward the source compute node 150a (e.g. due to congestion of a network link or failure of the physical medium, e.g. a faulty optical fiber). For example, migration of the stateless computation service might be a transfer in scenarios of planned downtime of the source compute node 150a (e.g. for maintenance purposes). In such scenarios, the transfer might be temporary until the source compute node 150a is back up and running, at which point the stateless computation service might be transferred back to the source compute node 150a. Further examples relating to this are provided below.

The target compute node 150b might be selected from a group of candidate target compute nodes 150b, 150c. In particular, according to an embodiment the control node 200 is configured to perform (optional) step S104:

S104: The control node 200 obtains information indicative of network-level configuration parameters from the core network node 300. The group of candidate target compute nodes is then 150b, 150c identified based on the obtained information, for which examples have been provided above. Additionally, the network-level configuration parameters might be taken into account when there is a large number of candidate compute nodes 150b, 150c, distributed in a large network 100. In such scenarios, both capacity of the candidate compute nodes 150b, 150c but also their position in the network 100 should to be taken into consideration. Networks of mobile network operators are representative examples of such complexity.

In some aspects, certain deployed stateless computation services might not run on certain compute nodes. Vice versa, certain compute nodes might not be capable of running certain stateless computation services. Therefore, in order to ensure that the target compute node 150b is suitable to run the stateless computation services the target compute node 150b might be matched against a requirement profile.

Further details of the requirement profile will now be disclosed.

In some aspects, the requirement profile concerns the available capacity of the compute nodes. The available capacity could pertain to the minimum requirements in terms of CPU, storage, RAM, GPU/TPU and other resources needed at the compute node to execute the stateless computation service.

In some aspects the requirement profile concerns the location of the compute nodes with respect to the UE requesting execution of the stateless computation service. The location could pertain to the distance between the compute node and the UE requesting execution of the stateless computation service, whereby the distance could e.g. be defined in terms of requirements of the round-trip time (RTT) between the compute node and the UE requesting execution of the stateless computation service.

In some aspects the requirement profile concerns the location of the compute nodes with respect to absolute geographical area. The requirement profile might thereby be geo-fence related such that the stateless computation service cannot be migrated to a compute node located outside of a specific geographic area.

In some aspects the requirement profile concerns the location of the compute nodes in the mobile communication network 100. The location could pertain to whether the target compute node should be located in the radio access network 110, the core network 120, or in the packet data network 130. Further, the location could pertain to whether the target compute node should be located in one specific packet data network, or in another specific packet data network, at one specific base station 170, or another specific base station, etc.

As the skilled person understands, also other properties might be considered by the requirement profile.

The requirement profile might be accessible to the control node 200 and used when identifying which compute node the stateless computation service is to be migrated to, or at least when identifying those candidate target compute nodes 150b, 150c in the group that fulfil the requirement profile. In particular, according to an embodiment the control node 200 is configured to perform (optional) step S106:

S106: The control node 200 obtains a requirement profile for the stateless computation service. The target compute node 150b is then selected from those candidate target compute nodes 15b, 150c in the group that fulfil the requirement profile.

In this respect, the requirement profile might be dynamically changing. For example, there might be different requirements for the stateless computation service for different times during the day, where, for instance, there are more requests for the stateless computation service during a certain period during the day than during other times during the day, and/or where, for instance, there are requests for different types of stateless computation services during different times of the day. Hence, the requirement profile might be periodically updated.

As disclosed below, the migration process is triggered upon a need results e.g. from resource utilization at the source compute node 150a being too high, and/or a demand from UE 160 for the stateless computation service elsewhere in the mobile communication network 100. Further in this respect, the need might thus be triggered either by too many execution requests for the stateless computation service (e.g. in terms of number of requests for the stateless computation service being above over a request threshold value within a specific unit of time), or by computational capacity issues on the source compute node 150a currently executing the stateless computation service.

As a first example, the control node 200 might obtain information that a large number of requests is sent towards a stateless computation service executed on a specific compute node. It could therefore be desirable to migrate the stateless computation service to another compute node located closer to the requesting UE. For example, some performance indicators might show that the RTTs between the UE and the source compute node 150a executing the stateless computation service are too high. This can either be triggered as an event or be the response to a utilization request. The control node 200 might then create, or access, a requirement profile with suitable requirements on location in terms of RTT such that the stateless computation service is to be migrated to a target compute node located closer to the UE than the source computed node (e.g., such that the target compute node is located closer to the network edge than the source computed node). The control node 200 might then traverse a group of candidate target compute nodes fulfilling the requirement profile in order to identify which target compute node the stateless computation service is to be migrated to. In the present scenario, the resulting migration would probably be of type replicate, to allow the source compute node to still serve other UE requesting execution of the stateless computation service.

In a second example, the source compute node is overloaded by other types of traffic. It could therefore be desirable to migrate the stateless computation service to a compute node that has lower load than the source compute node. For example, some performance indicators might show that the computational resource utilization at the source compute node is too high. This can either be triggered as an event or be the response to a utilization request. The control node 200 might then create, or access, a requirement profile with suitable requirements on computational capacity such that the stateless computation service is to be migrated to a target compute node with sufficient requirements on computational capacity and with suitable requirements on location in terms of RTT. The control node 200 might then traverse a group of candidate target compute nodes fulfilling the requirement profile in order to identify which target compute node the stateless computation service is to be migrated to. In the present scenario, the resulting migration would probably be of type transfer, to free computational resources at the source compute node. However, the resulting migration could also be of type replicate, if the source compute node still needs to execute the stateless computation service for some UE. The source compute node might still be able to free some computational resources due to the migration, where some of the UE instead would request execution of the stateless computation service at the target compute node.

Figure 3:
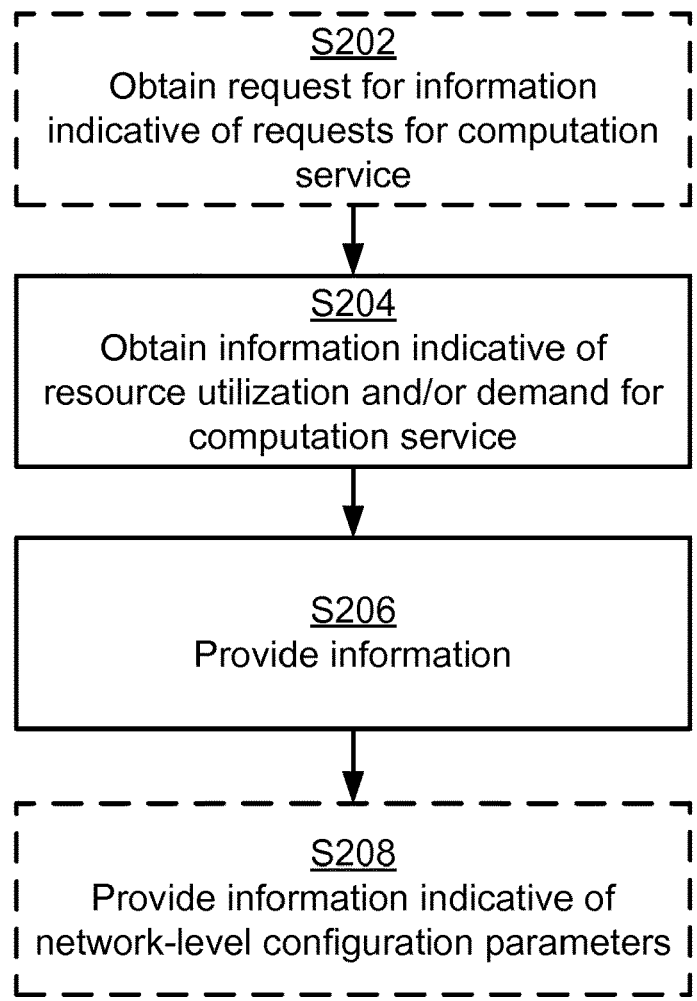

Reference is now made to FIG. 3 illustrating a method for facilitating migration of a stateless computational service in a mobile communication network 100 as performed by the core network node 300 according to an embodiment.

It is assumed that the core network node 300 monitors information from the mobility function entity 140 in the mobile communication network 100. Particularly, the core network node 300 is configured to perform step S204:

S204: The core network node 300 obtains information from the mobility function entity 140 in the mobile communication network 100. The information is indicative of resource utilization at a source compute node 150a in the mobile communication network 100 hosting the stateless computation service. Additionally or alternatively the information is indicative of demand from UE 160 for the stateless computation service elsewhere in the mobile communication network 100.

It is further assumed that the core network node 300 forwards this information towards the control node 200. Hence, the core network node 300 is configured to perform step S206:

S206: The core network node 300 provides, towards the control node 200 in the mobile communication network 100, the information.

Embodiments relating to further details of facilitating migration of a stateless computational service in a mobile communication network 100 as performed by the core network node 300 will now be disclosed.

In general terms, the core network node 300 provides notification of desired events to the control node 200 regarding the UE 160. In particular, these notifications concerns requests made by the UE 160 for execution of the stateless computation service. That is, when a UE 160 requests execution of a stateless computation service, the core network node 300 is notified about it and in turns notifies the control node 200. Hence, according to an embodiment, the demand (as specified in step S204) is represented by requests obtained from the UE 160 for execution of the stateless computation service. According to an embodiment, the demand is represented by requests obtained from the UE 160 for execution of the stateless computation service. In particular, according to an embodiment the core network node 300 is configured to perform (optional) step S202:

S202: The core network node 300 obtains a request from the control node 200 for information indicative of requests for execution of the stateless computation service for a set of UE 160. The demand is then represented only by requests obtained from the UE 160 in the set of UE 160.

The core network node 300 might also provide information on network-level configuration parameters to the control node 200. In particular, according to an embodiment the core network node 300 is configured to perform (optional) step S208:

S208: The core network node 300 provides information indicative of network-level configuration parameters towards the control node 200.

According to an embodiment, the information indicative of network-level configuration parameters only is provided towards the control node 200 upon having obtained a request for the network-level configuration parameters from the control node 200.

In particular, the network-level configuration parameters might concern network topology and status parameters.

For example, upon a request from the control node 200, the core network node 300 will send back to the control node 200 the network topology. The network topology can be thought as a graph of interlinked compute nodes, each compute node containing metadata describing it. In its simplest form, this metadata could be a simple text description; if this compute node is part of the radio access network 110, the core network 120, or the packet based service data networks 130, and an indication of its computational capacity and current computational resource utilization (e.g. in terms of floating operations per second (FLOPS) or in terms of a hardware description in terms of available CPU, HDD, RAM, GPU, etc.). The current computational resource utilization could be given as a percentage of the maximum computational resource utilization. Hence, according to an embodiment, the resource utilization at the source compute node 150a is represented by a value of either relative or absolute resource utilization at the source compute node 150a. In addition, geographical location can also be reported as a static parameter.

Figure 4:
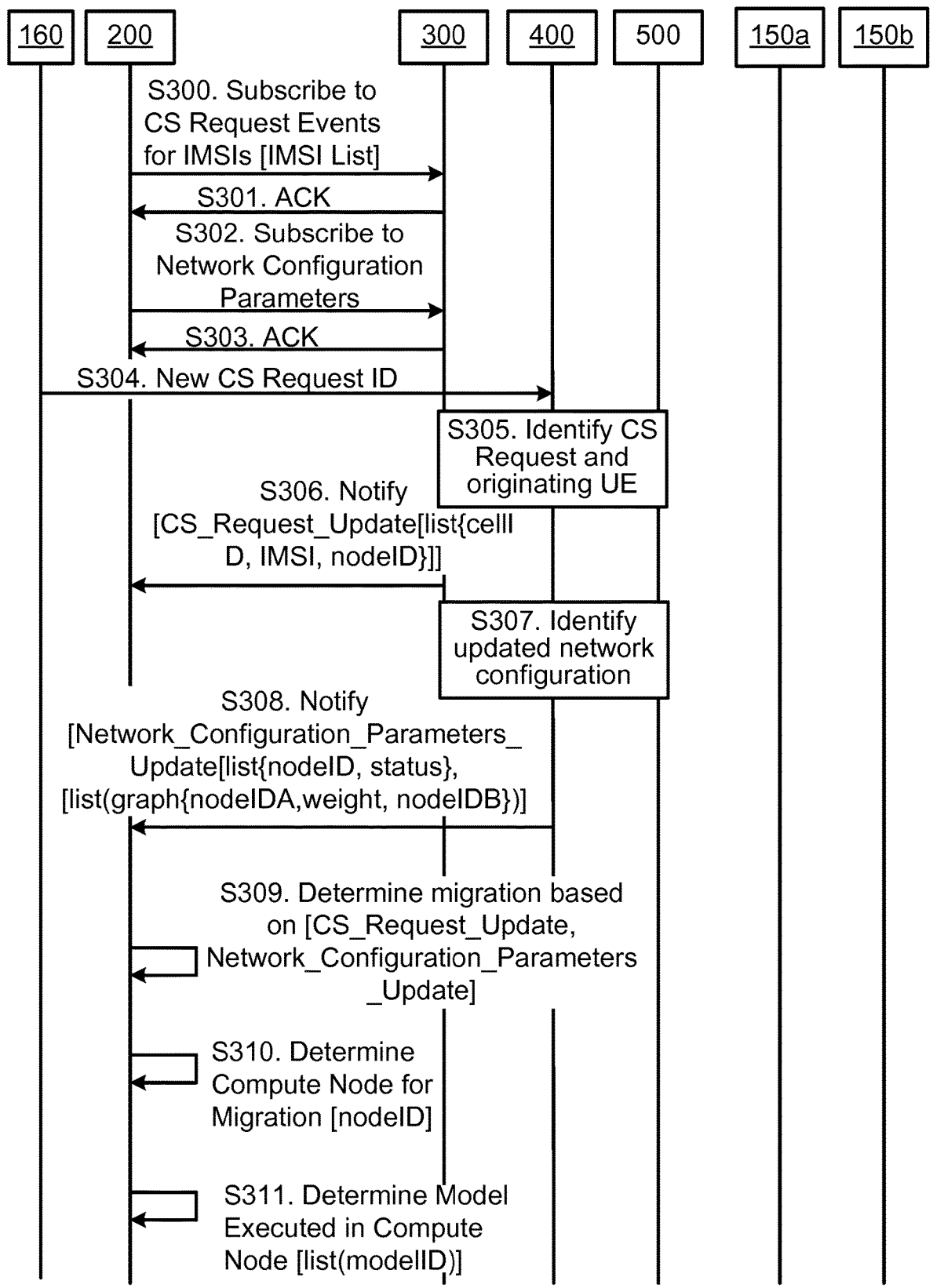
FIG. 4 is a signalling diagram according to an embodiment.
Figure 4:
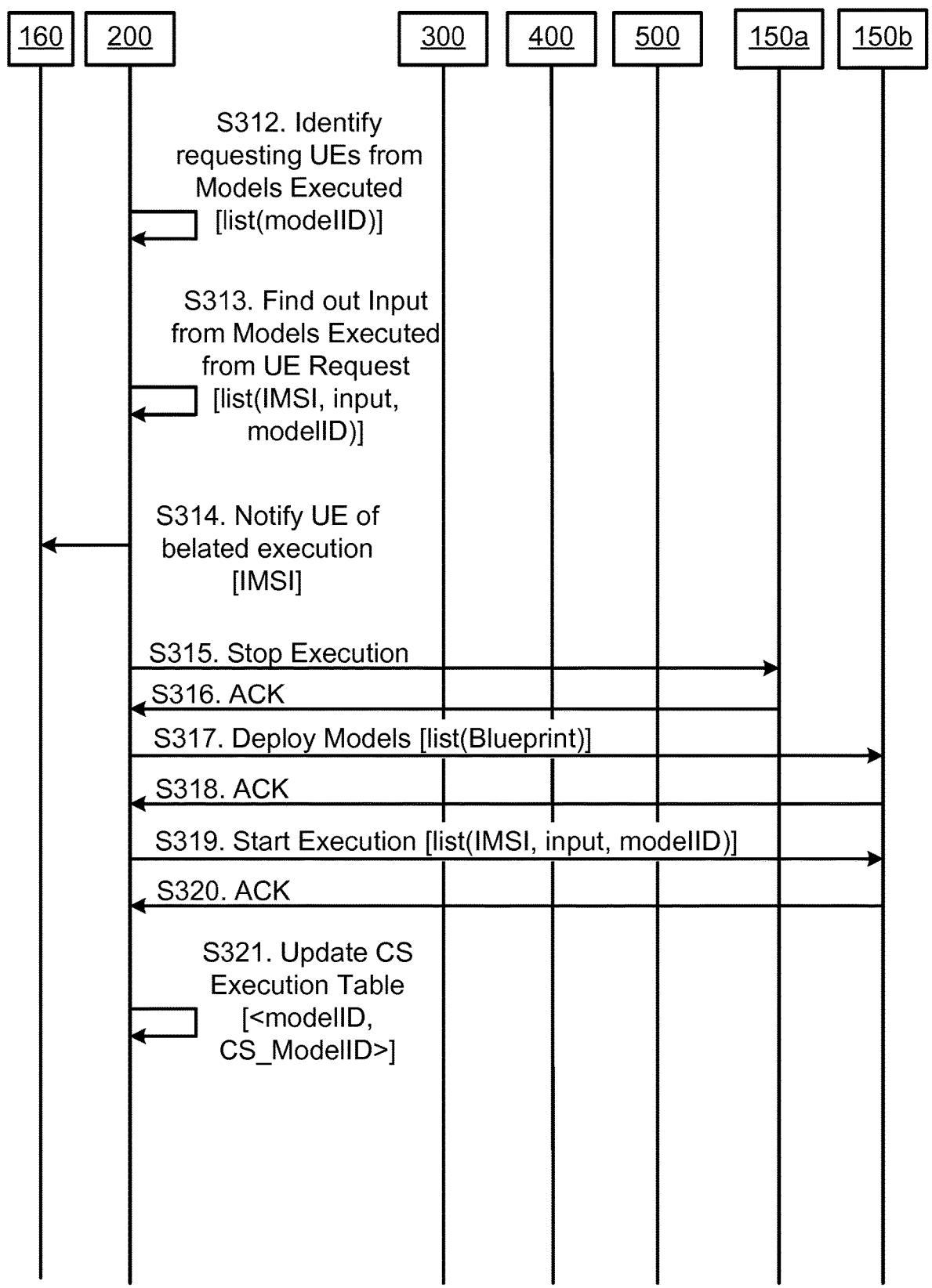

One particular embodiment for migration of a stateless computational service in a mobile communication network 100 and for facilitating such migration based on at least some of the above disclosed embodiments will now be disclosed in detail with reference to the signalling diagram of FIG. 4 according to which signalling is performed among the source compute node 150a, the target compute node 150b, the UE 160, the control node 200, the core network node 300, a mobility function 400 (such as a Mobility Management Entity (MME) or an Access and Mobility Management Function (AMF)), and a user data node 500 (such as a Home Subscriber Server (HSS) or a Unified Data Management (UDM) node).

S300: The control node 200 requests to subscribe to events pertaining to the stateless computational service from the core network node 300 by sending a message "Subscribe to CS Request Events for IMSIs [IMSI List]", where IMSI List comprises a a list of International Mobile Subscription Identifiers (IMSIs). Each IMSI uniquely identifies a UE in the PLMN, and the list could include all IMSIs, or a subgroup of IMSIs (e.g. linked to a vertical enterprise such as connected vehicles, robots, IoT devices, etc., or sharing other properties (e.g. manufacturer of radio module, location, UE capability, etc.)).

S301: The core network node 300 accepts the request by sending a message "ACK" to the control node 200 to acknowledge acceptance of the request. If the core network node 300 does not accept the request (for examples due to that the core network node 300 is not authorized to be informed about the IMSI ranges requested, or due to a malformed request), a negative acknowledgement (NACK) is sent instead.

S302: The control node 200 requests to subscribe to network configuration parameters from the core network node 300 by sending a message "Subscribe to Network Configuration Parameters" to the core network node 300.

S303: The core network node 300 accepts the request by sending a message "ACK" to the control node 200 to acknowledge acceptance of the request. If the core network node 300 does not accept the request, a negative acknowledgement (NACK) is sent instead.

Steps S300 to S303 could e.g. be performed as part of a bootstrapping procedure between the control node 200 and the core network node 300.

S304: The UE 160 request execution of a certain stateless computational service, by sending to the mobility function 400 a message "New CS Request ID", where ID is an identifier of the stateless computational service.

S305: The core network node 300, possibly by obtaining information from the mobility function 400 and the user data node 500, identifies the requested stateless computational service and the identity of the UE 160.

In this respect, the mobility function 400 and the user data node 500 might be involved in some secure implementation. One example could be where the UE 160 for security purposes does not send its identity (i.e., IMSI) to the core network node 300 in order not to reveal it to any possible malicious nodes listening for it. Instead, the UE 160 sends a generated IMSI (C-IMSI), which the mobility function 400 assigns during initial UE attachment (i.e. when the UE 160 first connects to the mobile communications network 100), and then the mobility function 400 matches the generated IMSI to a real IMSI, whenever the real IMSI is revealed, and provides information to the core network node 300 such that the core network node can identify the identity of the UE 160 and the stateless computational service as requested by this UE 160.

S306: The core network node 300 notifies the control node 200 by sending to the control node 200 a message "Notify [CS_Request_Update[list{cellID, IMSI, nodeID}]]", where cellID is the identity of the cell providing network access to the UE 160, where IMSI is the IMSI of the UE 160, and where nodeID identifies the compute node serving the request.

S307: The core network node 300, possibly by obtaining information from the mobility function 400 and the user data node 500, identifies an updated network configuration.

S308: The core network node 300 notifies the control node 200 about the updated network configuration by sending to the control node 200 a message "Notify [Network_Configuration_Parameters_Update[list{nodeID, status}, [list(graph{nodeIDA,weight, nodeIDB}]]" where nodeID uniquely identifies the compute node and status denotes the status of the compute node. Status is an indication of the compute node's capacity and current use (e.g. capacity could use a standard metric such as FLOPS or a hardware description in terms of available CPU, HDD, RAM, GPU, etc. Capacity used could be a simple percentage of total capacity). In addition, geographical location may also be part of the status. NodeIDA uniquely identifies a first (source) compute node 150a, where weight represents a rating of the network link between nodeIDA and nodeIDB, and where nodeIDB uniquely identifies the second (target) compute node 150b. The weight is a rating of how good or bad the network link is between these two compute nodes.

S309: The control node 200 makes a decision to migrate the stateless computational service based parameters of CS_Request_Update and Network_Configuration_Parameters_Update as received in the messages from the core network node 300 in step S306 and S308.

S310: The control node 200 determines a source compute node 150a and a target compute node 150b.

S311: The control node 200 determines which stateless computational service is executed by the source compute node 150a.

S312: The control node 200 identifies, and collects in a list, those pieces of UE 160 for which the stateless computational service that is to be migrated is executed.

S313: The control node 200 identifies, and collects in a list, which input is used by the identified pieces of UE 160 to the stateless computational service.

S314: The control node 200 notifies all UE 160 in the list of IMSIs that are using the stateless computational service that execution of the stateless computational service is belated.

S315: The control node 200 instructs the source compute node 150a to stop execution of the stateless computational service.

S316: The source compute node 150a stops execution of the stateless computational service and sends a message "ACK" to the control node 200 to acknowledge that the execution has been stopped.

S317: The control node 200 instructs the target compute node 150b to deploy the stateless computational service by sending a message "Deploy Models [list(Blueprint)]" comprising a blueprint of the stateless computational service.

S318: The target compute node 150b deploys the stateless computational service and sends a message "ACK" to the control node 200 to acknowledge that the stateless computational service has been deployed.

S319: The control node 200 instructs the target compute node 150b to start execution of the stateless computational service by sending a message "Start Execution [list(IMSI, input, modelID)]", where the IMSI is the IMSI of the UE 160 that originated the execution request, input is the input to the service to be executed and modelID is an identifier of the service to be executed (for example a machine learning model or any other compute service).

S320: The target compute node 150b starts execution of the stateless computational and sends a message "ACK" to the control node 200 to acknowledge that the execution has been started.

S321: The control node 200 updates its record of active service executions. This table is used for the control node 200 to keep track of which compute nodes are executing which stateless computational services.

Figure 5:
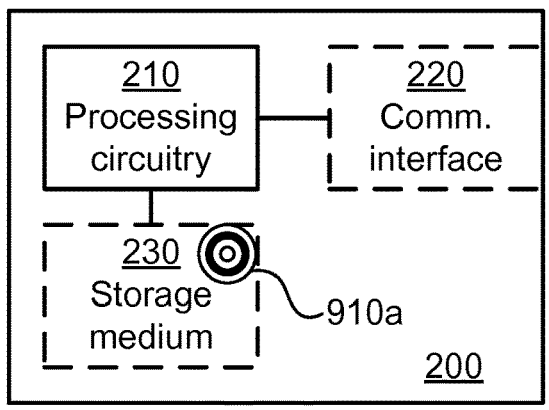
FIG. 5 is a schematic diagram showing functional units of a control node according to an embodiment.

FIG. 5 schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, or steps, as disclosed above. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The control node 200 may further comprise a communications interface 220 for communications with other entities, nodes, functions, equipment, and devices of the mobile communication network 100. As such the communications interface 220 may comprise one or more transmitters and receivers, comprising analogue and digital components.

The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 6:
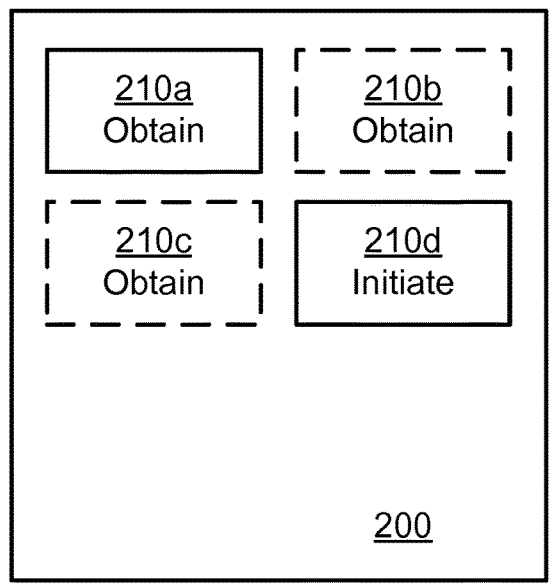
FIG. 6 is a schematic diagram showing functional modules of a control node according to an embodiment.

FIG. 6 schematically illustrates, in terms of a number of functional modules, the components of a control node 200 according to an embodiment. The control node 200 of FIG. 6 comprises a number of functional modules; a first obtain module 210a configured to perform step S102 and thus to obtain, from the core network node 300, information indicative of a need to migrate the stateless computation service from a source compute node 150a in the mobile communication network 100, and an initiate module 210d configured to perform step S108 and thus to initiate migration of the stateless computation service from the source compute node 150a to the target compute node 150b in the mobile communication network 100 for hosting of the stateless computation service at the target compute node 150b. The control node 200 of FIG. 6 may further comprise a number of optional functional modules, such as any of a second obtain module 210*b* configured to perform step S104 and thus to obtain information indicative of network-level configuration parameters from the core network node 300, and a third obtain module 210*c* configured to perform step S106 and thus to obtain a requirement profile for the stateless computation service. In general terms, each functional module 210*a*-210*d* may be implemented in hardware or in software. Preferably, one or more or all functional modules 210*a*-210*d* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*d* and to execute these instructions, thereby performing any steps of the control node 200 as disclosed herein.

Figure 7:
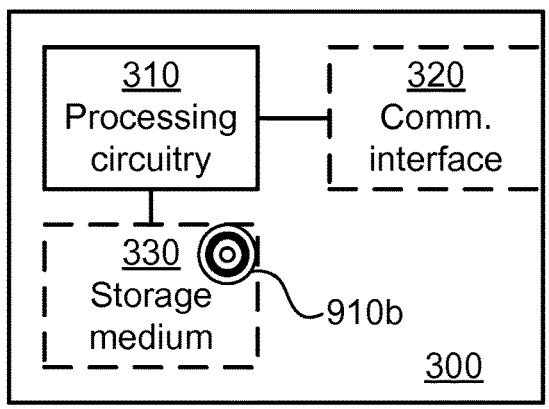
FIG. 7 is a schematic diagram showing functional units of a core network node according to an embodiment.

FIG. 7 schematically illustrates, in terms of a number of functional units, the components of a core network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910*b* (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the core network node 300 to perform a set of operations, or steps, as disclosed above. For example, the storage medium 330 may store the set of operations, and the processing circuitry 310 may be configured to retrieve the set of operations from the storage medium 330 to cause the core network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The core network node 300 may further comprise a communications interface 320 for communications with other entities, nodes, functions, equipment, and devices of the mobile communication network 100. As such the communications interface 320 may comprise one or more transmitters and receivers, comprising analogue and digital components.

The processing circuitry 310 controls the general operation of the core network node 300 e.g. by sending data and control signals to the communications interface 320 and the storage medium 330, by receiving data and reports from the communications interface 320, and by retrieving data and instructions from the storage medium 330. Other components, as well as the related functionality, of the core network node 300 are omitted in order not to obscure the concepts presented herein.

Figure 8:
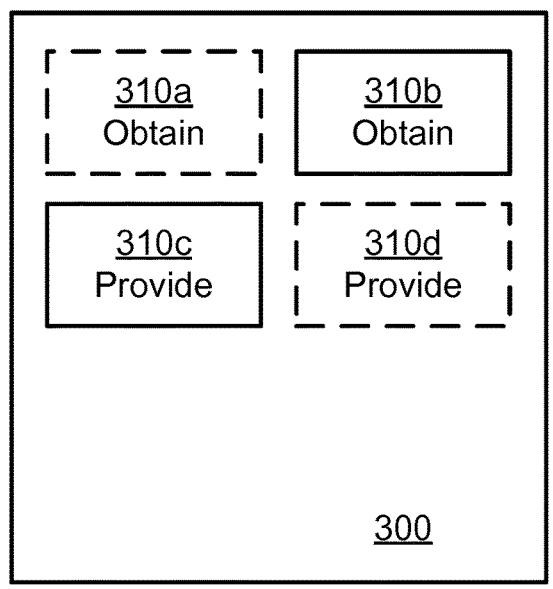
FIG. 8 is a schematic diagram showing functional modules of a core network node according to an embodiment.

FIG. 8 schematically illustrates, in terms of a number of functional modules, the components of a core network node 300 according to an embodiment. The core network node 300 of FIG. 8 comprises a number of functional modules; a first obtain module 310*b* configured to perform step S204 and thus to obtain, from a mobility function entity 140 in the mobile communication network 100, information indicative of resource utilization at a source compute node 150*a* in the mobile communication network 100 hosting the stateless computation service, and/or demand from UE 160 for the stateless computation service elsewhere in the mobile communication network 100, and a first provide module 310*c* configured to perform step S206 and thus to provide S206, towards a control node 200 in the mobile communication network 100, the information as obtained by the first obtain module 310*b*. The core network node 300 of FIG. 8 may further comprise a number of optional functional modules, such as any of a second obtain module 310*a* configured to perform step S202 and thus to obtain a request from the control node 200 for information indicative of requests for execution of the stateless computation service for a set of UE 160, and a second provide module 310*d* configured to perform step S208 and thus to provide information indicative of network-level configuration parameters towards the control node 200. In general terms, each functional module 310*a*-310*d* may be implemented in hardware or in software. Preferably, one or more or all functional modules 310*a*-310*d* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*d* and to execute these instructions, thereby performing any steps of the core network node 300 as disclosed herein.

The control node 200 and/or core network node 300 may be provided as a standalone device or as a part of at least one further device. For example, the control node 200 and/or core network node 300 may be provided in a node of the core network 120, as illustrated in the example of FIG. 1. Alternatively, functionality of the control node 200 and/or core network node 300 may be distributed between at least two devices, or nodes. Further, a first portion of the instructions performed by the control node 200 and/or core network node 300 may be executed in a respective first device, and a second portion of the instructions performed by the control node 200 and/or core network node 300 may be executed in a respective second device; the herein disclosed embodiments are not limited to any particular number of devices on which the instructions performed by the control node 200 and/or core network node 300 may be executed. Hence, the methods according to the herein disclosed embodiments are suitable to be performed by a control node 200 and/or core network node 300 residing in a cloud computational environment. Therefore, although a single processing circuitry 210, 310 is illustrated in FIGS. 5 and 7 the processing circuitry 210, 310 may be distributed among a plurality of devices, or nodes. The same applies to the functional modules 210*a*-210*d*, 310*a*-310*d* of FIGS. 6 and 8 and the computer programs 920*a*, 920*b* of FIG. 9.

Figure 9:
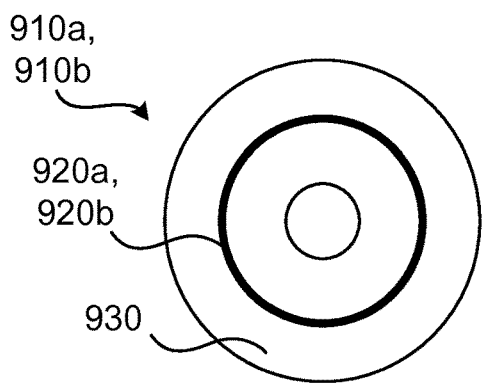
FIG. 9 shows one example of a computer program product comprising computer readable means according to an embodiment.

FIG. 9 shows one example of a computer program product 910*a*, 910*b* comprising computer readable means 930. On this computer readable means 930, a computer program 920*a* can be stored, which computer program 920*a* can cause the processing circuitry 210 and thereto operatively coupled entities and devices, such as the communications interface 220 and the storage medium 230, to execute methods according to embodiments described herein. The computer program 920*a* and/or computer program product 910*a* may thus provide means for performing any steps of the control node 200 as herein disclosed. On this computer readable means 930, a computer program 920*b* can be stored, which computer program 920*b* can cause the processing circuitry 310 and thereto operatively coupled entities and devices, such as the communications interface 320 and the storage medium 330, to execute methods according to embodiments described herein. The computer program 920*b* and/or computer program product 910b may thus provide means for performing any steps of the core network node 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method, performed by a control node, for migration of a stateless computation service in a mobile communication network, the method comprising:
    obtaining, from a core network node in the mobile communication network, information indicative of a need to migrate the stateless computation service from a source compute node in the mobile communication network, the need resulting from resource utilization at the source compute node being too high, or a demand from a user equipment (UE) for the stateless computation service elsewhere in the mobile communication network, or both;
    obtaining information indicative of network-level configuration parameters from the core network node, and wherein a target compute node is selected from a group of candidate target compute nodes, the group of candidate target compute nodes being identified based on the obtained information;
    obtaining a requirement profile for the stateless computation service, and wherein the target compute node is selected from those candidate target compute nodes in a group that fulfil the requirement profile, wherein the requirement profile is a location profile based on location of the UE or a specific geographical area; and
    initiating, based on the obtained information and the requirement profile, migration of the stateless computation service from the source compute node to a target compute node in the mobile communication network for hosting of the stateless computation service at the target compute node.

2. The method according to claim 1, wherein the migration pertains to either a replication or a transfer of the stateless computation service.

3. The method according to claim 2, wherein whether to replicate or to transfer the stateless computation service depends on which type the need is.

4. The method according to claim 2, wherein, for replication of the stateless computation service at the target compute node, the stateless computation service also is maintained at the source compute node upon the migration.

5. The method according to claim 2, wherein, for transfer of the stateless computation service to the target compute node, the stateless computation service is removed from the source compute node upon the migration.

6. The method according to claim 1, wherein the source compute node and the target compute node each is provided in a node of a radio access network, a core network, or a packet data network of the mobile communication network.

7. A control node for migration of a stateless computation service in a mobile communication network, the control node comprising:
    processing circuitry; and
    a storage medium containing instructions which, when executed by the processing circuitry, cause the control node to:
        obtain, from a core network node in the mobile communication network, information indicative of a need to migrate the stateless computation service from a source compute node in the mobile communication network, the need resulting from resource utilization at the source compute node being too high, a demand from a user equipment (UE) for the stateless computation service elsewhere in the mobile communication network, or both;
        obtain information indicative of network-level configuration parameters from the core network node, and wherein a target compute node is selected from a group of candidate target compute nodes, the group of candidate target compute nodes being identified based on the obtained information;
        obtain a requirement profile for the stateless computation service, and wherein the target compute node is selected from those candidate target compute nodes in a group that fulfil the requirement profile, wherein the requirement profile is a location profile based on location of the UE or a specific geographical area; and
        initiate, based on the obtained information and the requirement profile, migration of the stateless computation service from the source compute node to a target compute node in the mobile communication network for hosting of the stateless computation service at the target compute node.

8. The control node according to claim 7, wherein the migration pertains to either a replication or a transfer of the stateless computation service.

* * * * *